US011956694B2

(12) United States Patent
Laakkonen et al.

(10) Patent No.: US 11,956,694 B2
(45) Date of Patent: Apr. 9, 2024

(54) TRACKING SENSOR ARRANGEMENT FOR DETECTION OF A TRACKING UNIT, AND DEVICE AND METHOD THEREOF

(71) Applicant: Sensire Oy, Joensuu (FI)

(72) Inventors: Ossi Laakkonen, Joensuu (FI); Aki Hännikäinen, Joensuu (FI); Antti Tolonen, Joensuu (FI)

(73) Assignee: Sensire Oy, Joensuu (FI)

( * ) Notice: Subject to any disclaimer, the term of this patent is extended or adjusted under 35 U.S.C. 154(b) by 539 days.

(21) Appl. No.: 17/256,068

(22) PCT Filed: Jul. 1, 2019

(86) PCT No.: PCT/EP2019/067608
§ 371 (c)(1),
(2) Date: Dec. 24, 2020

(87) PCT Pub. No.: WO2020/002708
PCT Pub. Date: Jan. 2, 2020

(65) Prior Publication Data
US 2021/0274316 A1  Sep. 2, 2021

Related U.S. Application Data

(60) Provisional application No. 62/691,769, filed on Jun. 29, 2018.

(51) Int. Cl.
*H04W 4/02* (2018.01)
*G01S 1/68* (2006.01)
(Continued)

(52) U.S. Cl.
CPC .............. *H04W 4/029* (2018.02); *G01S 1/68* (2013.01); *G01S 5/0284* (2013.01);
(Continued)

(58) Field of Classification Search
CPC ....... H04W 4/029; H04W 4/80; H04W 4/021; G01S 1/68; G06K 7/10297; G06K 7/10425; G06Q 50/28
(Continued)

(56) References Cited

U.S. PATENT DOCUMENTS 11,714,156 B2 *  8/2023  de la Broise ..... H04W 52/0229
                                                    340/539.13
2006/0208892 A1   9/2006  Ehrman et al.
(Continued)

FOREIGN PATENT DOCUMENTS

CA    2843287 A1 *  8/2014  ......... G06Q 20/3224
KR    1797231 B1 * 11/2017  ............... G01S 1/68

OTHER PUBLICATIONS

International Search Report of PCT/EP2019/067608 dated Sep. 5, 2019.

*Primary Examiner* — Harry K Liu
(74) *Attorney, Agent, or Firm* — Eversheds Sutherland (US) LLP

(57) ABSTRACT

A gateway device for associating the gateway device and tracking sensors as single a cargo unit: the gateway device being associable with a cargo unit, said gateway device comprising: means to detect position or movement, and short-range wireless communication means for sending out a beacon signal and connecting with nodes, characterized in that the gateway device is arranged to detect which nodes are still in short-range communications range when change of position or movement is detected and associating the nodes that are still in range with as being part of the same cargo unit as the gateway device. Corresponding arrangement and method are also presented.

9 Claims, 4 Drawing Sheets

(51) Int. Cl.
  *G01S 5/02*   (2010.01)
  *G06K 7/10*   (2006.01)
  *G06Q 10/08*  (2023.01)
  *H04W 4/021*  (2018.01)
  *H04W 4/029*  (2018.01)
  *H04W 4/80*   (2018.01)
  *B60P 1/64*   (2006.01)
  *H04W 88/16*  (2009.01)

(52) U.S. Cl.
  CPC ..... *G06K 7/10297* (2013.01); *G06K 7/10425* (2013.01); *G06Q 10/08* (2013.01); *H04W 4/021* (2013.01); *H04W 4/80* (2018.02); *B60P 1/6418* (2013.01); *H04W 88/16* (2013.01)

(58) Field of Classification Search
  USPC .......................................................... 342/378
  See application file for complete search history.

(56) References Cited

U.S. PATENT DOCUMENTS

| | | | |
|---|---|---|---|
| 2007/0079012 A1* | 4/2007 | Walker | G06Q 20/326 |
| | | | 709/249 |
| 2007/0216542 A1 | 9/2007 | Brosius et al. | |
| 2016/0379165 A1 | 12/2016 | Moakley et al. | |
| 2018/0014150 A1* | 1/2018 | Elias | G07C 9/28 |
| 2018/0075670 A1* | 3/2018 | Rajakondala | G06F 8/654 |
| 2022/0231919 A1* | 7/2022 | Pandey | H04W 4/40 |

* cited by examiner

TRACKING SENSOR ARRANGEMENT FOR DETECTION OF A TRACKING UNIT, AND DEVICE AND METHOD THEREOF

FIELD OF THE INVENTION

Generally the present invention relates to electronic devices and sensor arrangements in cargo tracking. Particularly, however not exclusively, the invention pertains to a gateway device, arrangement and method for tracking cargo and associating tracking sensors with a cargo unit.

BACKGROUND

Monitoring remotely cargo units is an essential part of modern tracking of intermodal transportation means. However, tracking sensors used today comprise little amount of communication means and in large system with multitudes of tracking sensors it is often difficult to remotely identify in-dividual tracking sensors. Moreover, in such systems it is even more difficult to corresponds them with certain different transport units.

Transmitting data during transit is however many a time as an important aspect of achieving real-time and intelligent tracking arrangements as is placing the tracking data with certain transport units. Knowing the state of the cargo may not only be approached from the viewpoint of disposing or using the cargo once the whole transit is done but also to make certain ac-tions during the transit if changes in the state of the cargo is detected.

Hence, being able to monitor cargo whatever the transportation means is and in sufficiently real-time is essential for managing the whole supply chain in an intelligent and preemptive manner. All transportation means may not be able to fix their cooling system, or repair cargo that has been shaken due to rough condition of the vessel or vehicle but a user detecting such failure in the supply chain and possible damage to the cargo may use the information to take action and quickly arrange for a replacement to be sent.

Prior art solutions have approached the tracking sensor management either by not having any positioning means or by having positioning means in the tracking sensor which makes the tracking sensor itself more compli-cated in design and more expensive as well. In system with a vast amount of sensors it is of essence to reduce the complexity and cost of single tracking sensors.

SUMMARY OF THE INVENTION

The objective of the embodiments of the present invention is to at least al-leviate one or more of the aforementioned drawbacks evident in the prior art arrangements particularly in the context of cargo tracking arrangements. The objective is generally achieved with a gateway device and sensor network arrangement in accordance with the present invention.

The present solution offers an intelligent and automated arrangement and method for determining sensors pertaining to certain cargo unit.

In accordance with one aspect of the present invention a gateway device for associating the gateway device and tracking sensors as single a cargo unit:
  the gateway device being associable with a cargo unit said gateway device comprising:
  means to detect position or movement, and
  short-range wireless communication means for sending out a beacon signal and connecting with nodes, characterized in that the gateway device is arranged to detect which nodes are still in short-range communications range when change of position or movement is detected and associating the nodes that are still in range with as being part of the same cargo unit as the gateway device.

In accordance with one aspect of the present invention an arrangement for associating tracking sensors with a cargo unit comprising:
  a gateway device associable with a cargo unit comprising means to detect position or movement, and short-range wireless communication means for sending out a beacon signal,
  tracking sensors nodes arranged to receive the beacon signal when in short-range communications proximity, characterized in that the gateway device is arranged to detect which tracking sensors nodes are still in short-range communications range when movement is detected and associating the sensors that are still in range with as being part of the same cargo unit as the gateway device.

According to an exemplary embodiment of the present invention the short-range communication means comprise IEEE 802.11, IEEE 802.15.1 and/or such ISM/SRD band communication means.

According to an exemplary embodiment of the present invention the means to detect position or movement comprise satellite navigation means.

According to an exemplary embodiment of the present invention movement is detected in accordance with predetermined geofences, such as that movement is detected only when moving in or out of geofences.

According to an exemplary embodiment of the present invention the cargo unit is a mobile cargo transport, such as aircraft, rail, ship or truck transport.

In accordance with one aspect of the present invention a method for associating tracking sensors with a cargo unit comprising:
  sending a beacon signal from a gateway device towards tracking sensors via short-range communications means,
  detecting tracking sensor nodes receiving the beacon signal,
  detecting movement or position change at the gateway device,
  detecting which tracking sensor nodes are still connected to the gateway device after the detected movement or position change,
  corresponding the gateway device and the tracking sensor nodes that are still connected to the gateway device after the detected movement or position change with a single cargo unit.

According to an exemplary embodiment of the present invention movement or position change are detected only when a predetermined threshold is met. According to an exemplary embodiment of the present invention the threshold for detecting movement or position change is moving in or out of a geofence.

As briefly reviewed hereinbefore, the utility of the different aspects of the present invention arises from a plurality of issues depending on each particular embodiment.

The expression "a number of" may herein refer to any positive integer starting from one (1). The expression "a plurality of" may refer to any positive integer starting from two (2), respectively.

The term "exemplary" refers herein to an example or example-like feature, not the sole or only preferable option.

Different embodiments of the present invention are also disclosed in the attached dependent claims.

BRIEF DESCRIPTION OF THE RELATED DRAWINGS

Next, some exemplary embodiments of the present invention are reviewed more closely with reference to the attached drawings, wherein FIG. 1 illustrates an arrangement and some associated aspects thereof in accordance with an embodiment of the present invention.

DETAILED DESCRIPTION OF THE EMBODIMENTS

Figure 1:
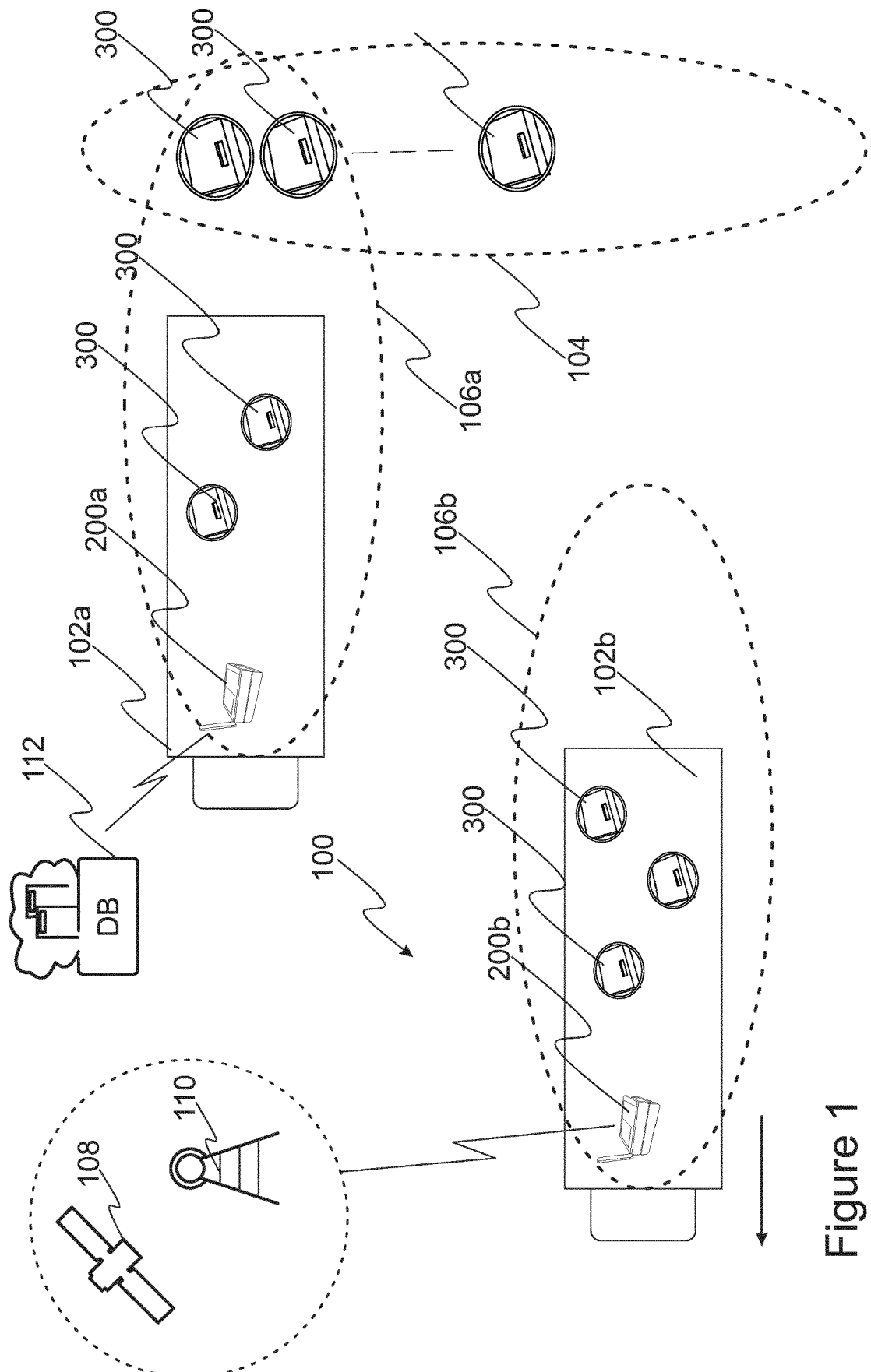

FIG. 1 illustrates an arrangement and some associated aspects thereof in accordance with an embodiment of the present invention.

The illustrated arrangement (100) comprises gateway devices (200a, 200b) associable with cargo units (106a, 106b) in two trucks (102a, 102b) and tracking sensor nodes (300) in the trucks (102a, 102b) and at another zone (104), such as a loading dock wherein other tracking sensor nodes connected to packages await for transportation.

The first truck (102a) is shown to be at the loading dock zone (104) and therein its gateway device (200a) sends a beacon signal and connects with nearby nodes that include both the nodes in the truck and some nodes in the loading dock.

The second truck (102b) is shown to be in move and its gateway device (200b) can detect the nearby nodes, which are the nodes that are in the truck. In this case the movement is detected either from a remote base station (110) or via satellite positioning means (108) and after the movement the nodes that are still detected to be in connection with the gateway device (200b) are determined to form the cargo unit (106b). Some nodes that might have been in the gateway device (200b) short-range communication network coverage, e.g. when close enough to the cargo unit (106b) at the loading bay, have dropped outside the coverage and therefore disconnected after which they are determined not to be included in the cargo unit (106b).

A threshold is preferably arranged to indicate sufficient movement after which it is determined which nodes are still in connection with the gateway device (200a, 200b). This way movement in general or short-range movement e.g. by moving inside a loading dock or terminal area may not yet constitute such movement which would determine the cargo unit (106a, 106b). This way e.g. truck moving around a loading area may not yet trigger the gateway device (200a, 200b) to determine the actual cargo unit (106a, 106b), which would constitute the final cargo unit (106a, 106b) leaving for transport. This threshold may be achieved e.g. with and in relation to geofences, such as that loading docks and such location within which movement doesn't trigger the gateway device (200a, 200b) to determine a cargo unit (106a, 106b) may be arranged as geofences and only leaving such geofence may be arranged to constitute movement or location change such as that the gateway device (200a, 200b) is triggered to determine the cargo unit (106a, 106b) by detecting nodes (300) in its short-range network range at the moment of leaving such geofence. Similarly a gateway device (200a, 200b) may be arranged to trigger movement or location change such that entering a geofence triggers the gateway device (200a, 200b) to determine the cargo unit (106a, 106b).

The arrangement may further comprise a remote server arrangement or cloud computing means (212) for collecting tracking sensor data via the gateway devices (200a, 200b) or directly from the tracking sensor nodes (300). The processing of data in the arrangement may utilize Edge computing means and/or the data may be processed at the cloud. Part of the tracking sensor data may be processed at the gateway devices (200a, 200b) or at the tracking sensor nodes (300).

The remote server or cloud server (212) may comprise at least means for processing, storing and provisioning of data. The data may be provided via a mobile app or web application provided on a user device. For example, sensor data from the cargo units (106a, 106b) and location of the cargo units (106a, 106b) may be monitored remotely via or from the remote server or cloud. At least parts of the arrangement software may be also controlled and/or updated remotely from the remote server or cloud.

Some exemplary applications of the arrangement comprise intermodal containers and shipping containers in general, cargo spaces, trailers, and any such spaces that benefit from essentially real-time monitoring, positioning and recognition of certain tracking sensor nodes in certain cargo units.

Figure 2:
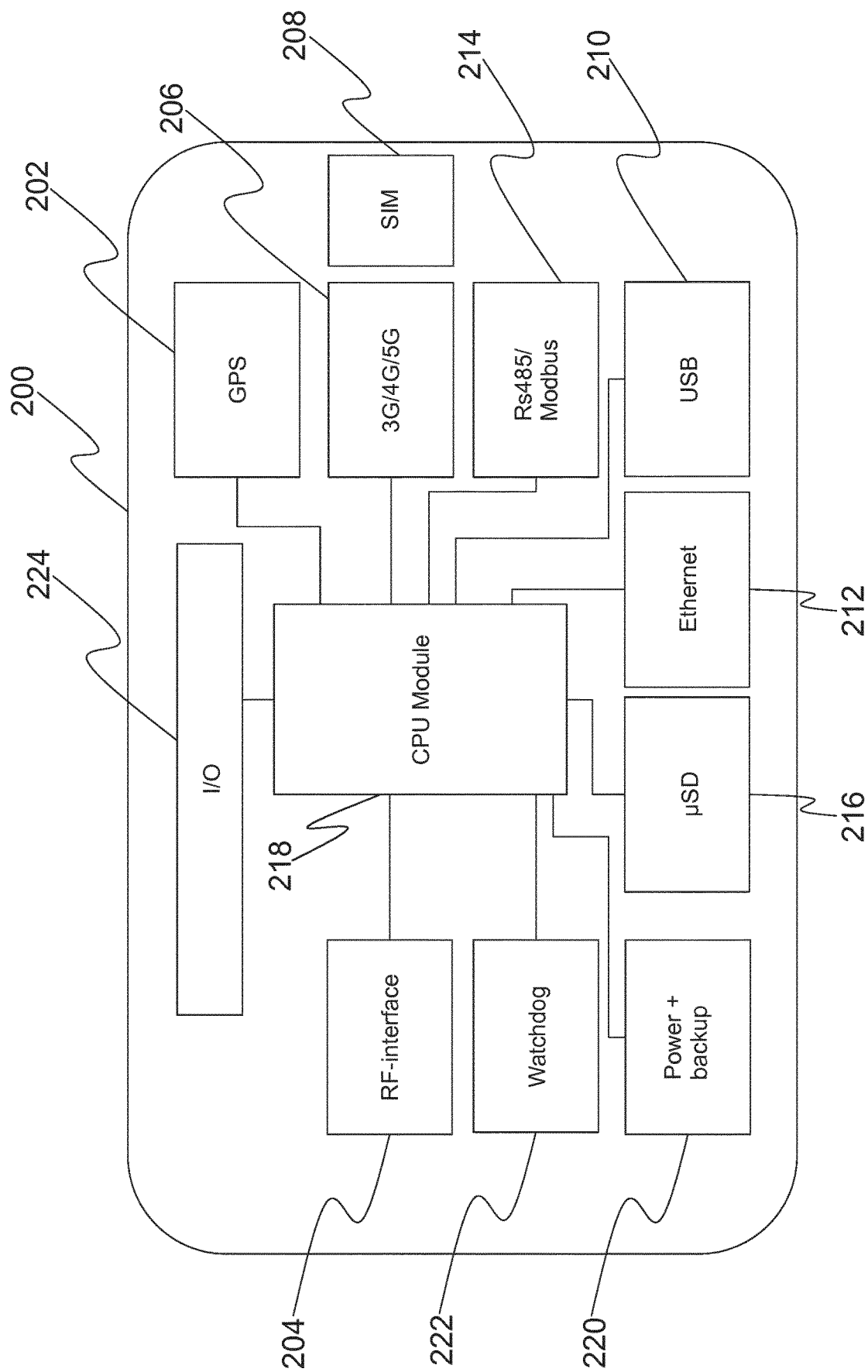
FIG. 2 illustrates a block diagram of the device in accordance with an embodiment of the present invention.

FIG. 2 illustrates a block diagram of the gateway device (200) in accordance with an embodiment of the present invention.

The gateway device (200) comprises means to detect the gateway device (200) location. For this purpose, some feasible positioning systems comprise e.g. GPS, A-GPS, GLONASS, GNSS, IRNSS, SBAS and BeiDou satellite systems. For positioning means, the gateway device (200) may comprise a chip, antenna or other such positioning components, such as a GPS chip (202). Another feasible means to detect the gateway device (200) location or gateway device movement (change of location) comprises Cell-ID or triangulation via connection with a number of base stations (110).

The gateway device (200) further comprises an RF-interface (204) with at least wireless UHF short-range transmission means and preferably also receiving means, such as IEEE 802.11, IEEE 802.15.1 and/or such ISM/SRD band communication means for at least connecting with wireless nodes and optionally also for receiving tracking data from the tracking sensor nodes (300).

The gateway device (200) may also comprise long-range communication means (206) to form an uplink via NB-IoT, LTE Cat-M1 and 2G/3G/4G/5G communication techniques. When needed, the gateway device (200) may also comprise a card SIM or a chip/software based E-SIM (208) for long-range communications via cellular means.

The gateway device (200) may be connected to a cargo unit, such as a truck, train or boat positioning or communications system, via a USB (210), Ethernet (212), Modbus or RS485 (214) or other cargo unit communication bus to receive information of movement or change in location.

The gateway device (200) may comprise also other essential components or circuits such as a memory (216) for storing information about RF frequency limitations associable with different locations and for storing tracking sensor data collected from tracking sensor nodes in the sensor network. The memory (216) may be used for retrieving information about RF frequency limitations associable with certain locations, which may be used when said information cannot be, or is not preferred to be, retrieved from a remote server (112) or such e.g. due to lack of cellular or WAN network coverage. This way tracking sensor data and information about which sensor belong to the cargo unit of the gateway may be stored even when there isn't communications networks coverage to send the information towards a base station (114). The memory (216) may be accessed and controlled by a CPU module (218), which may also carry various other tasks of the gateway device (200), such as controlling the transmission and receiving of data as well as positioning of the gateway device (200). The CPU module (218) may also be part of a RF SoC (System on a Chip). The CPU module (218) may comprise a FPU (Floating Point Unit), Flash memory and RAM (Random Access Memory). The gateway device (200) may further comprise a battery and power management means (220). The gateway device (200) may also comprise a watchdog timer (222) connected to the CPU module (218) for error detection. The gateway device (200) may also comprise a number of I/O ports (224) for connecting the gateway device (200) with peripheral devices.

Figure 3:
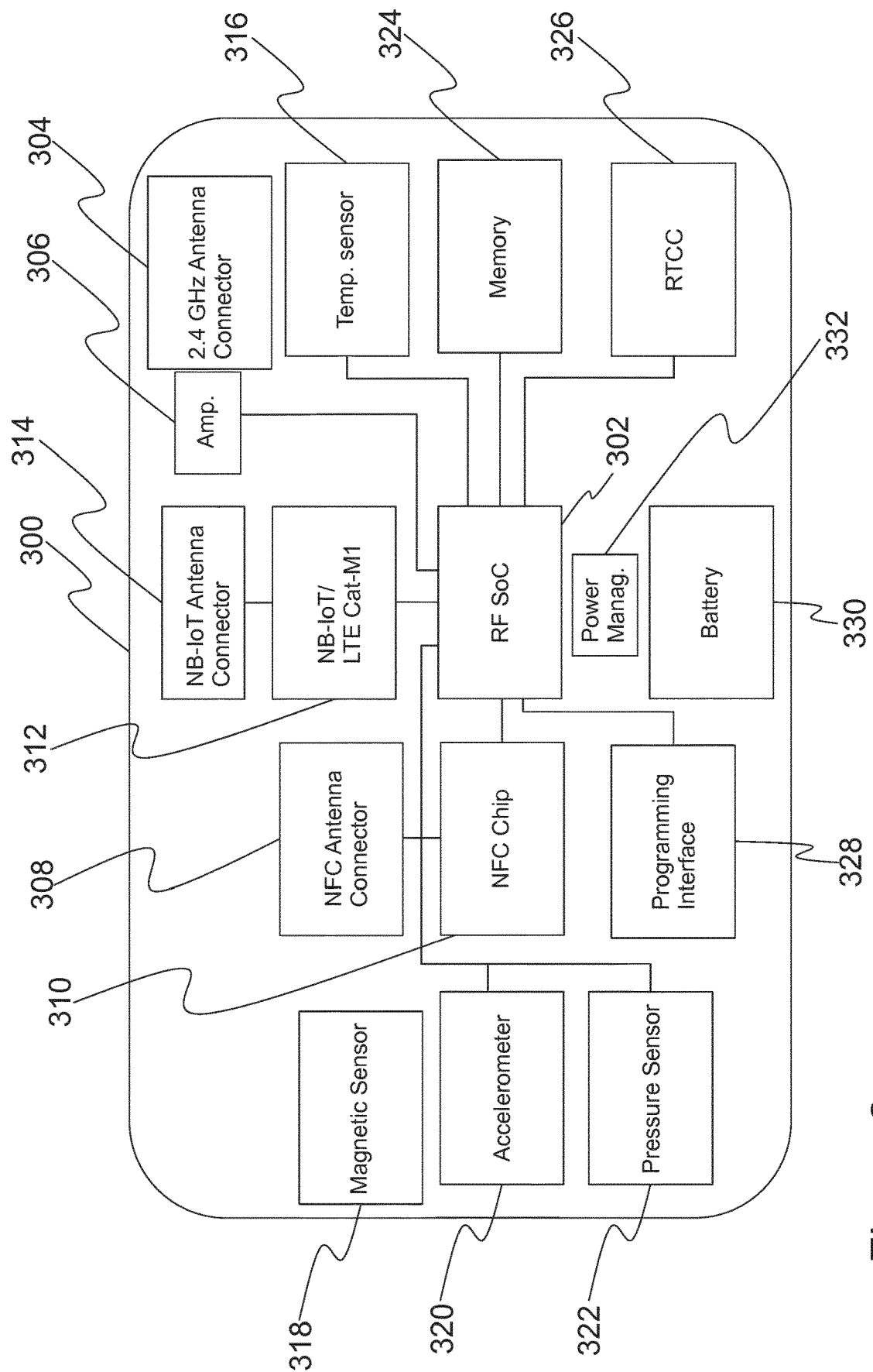
FIG. 3 illustrates a block diagram of a tracking sensor node in accordance with an embodiment of the present invention.

FIG. 3 illustrates a block diagram of a tracking sensor node (300) in accordance with an embodiment of the present invention.

The tracking sensor node (300) comprises at least an UHF transmitter, receiver and/or transceiver arranged to at least receive beacon signals from the gateway device (200) and to transmit signals to the gateway device (200) via short-range communications means. The UHF transmitter, receiver and/ or transceiver may comprise one or more circuits and components pertaining to RFID, NFC, IEEE 802.11 a/b/g/n, IEEE 802.15.1, IEEE 802.15.4 and/or such ISM/RSD band communication techniques and may be provided with a RF SoC (302). For example, the RF SoC (302) may be connected to a 2.4 GHz antenna connector (304) with an amplifier (306) for facilitating a transceiver for short-range communications. The RF SoC (302) may be also connected to an NFC chip (308) and NFC antenna connector (310) for facilitating a transceiver for near-field communications. The UHF tracking node sensor (300) receiver and/or transceiver is preferably essentially constantly on so that the presence of a gateway device (200) is detected via the beacon signals received from the gateway device (200) and hence that the tracking node sensor (300) may connect with the gateway device (200) in the short-range sensor network zone.

The tracking sensor nodes (300) may comprise also long-range transmission means for transmitting data to a base station. The long-range transmission means may comprise one or more circuits, chips (312), antenna connectors (314), antennas and amplification means pertaining NB-IoT, LTE Cat-M1 and 2G/3G/4G/5G communication techniques.

The tracking sensor nodes (300) preferably comprise active tracking sensors, which include active sensing means of a number of preferred param-eters for detecting the parameter with a sensor, and transmitting at least the sensor tracking data, such as measurement data, alerts, and/or metadata pertaining to measurements or the node functioning, to the gateway device (200) and/or to a base station wherefrom it may be delivered to a cloud da-tabase.

The tracking sensor nodes (300) may comprise one or more sensing means such as a number of ambient temperature sensors (316), magnetic sensors (318), accelerometers (320), pressure sensors (322) and gyroscope. These sensors may be used to detect ambient pressure, temperature, changes in velocity and rotation of the cargo, which may be further used to determine and monitor the conditions of the cargo that is transported. Clearly, other such sensing means for detecting events or changes in the ambient or internal conditions of the tracking sensor node (300) may be also utilized.

The tracking sensor nodes (300) may comprise also other essential components or circuits such as a memory (324) for at least for collecting tracking sensor data, such as sensing means measurements. The memory (324) may be used to store the sensor data also for longer periods of time when data transmission from the node (300) is disabled or otherwise limited. The tracking sensor node (300) may also comprise a real-time clock (RTC) or a real-time clock and calendar (RTCC) circuit (326) e.g. for exe-cuting a sleep/wake up scheme. The tracking sensor node (300) may also comprise a programming interface (328) connected to the RF SoC (302) as well as typical battery and power management means (330, 332).

Figure 4:
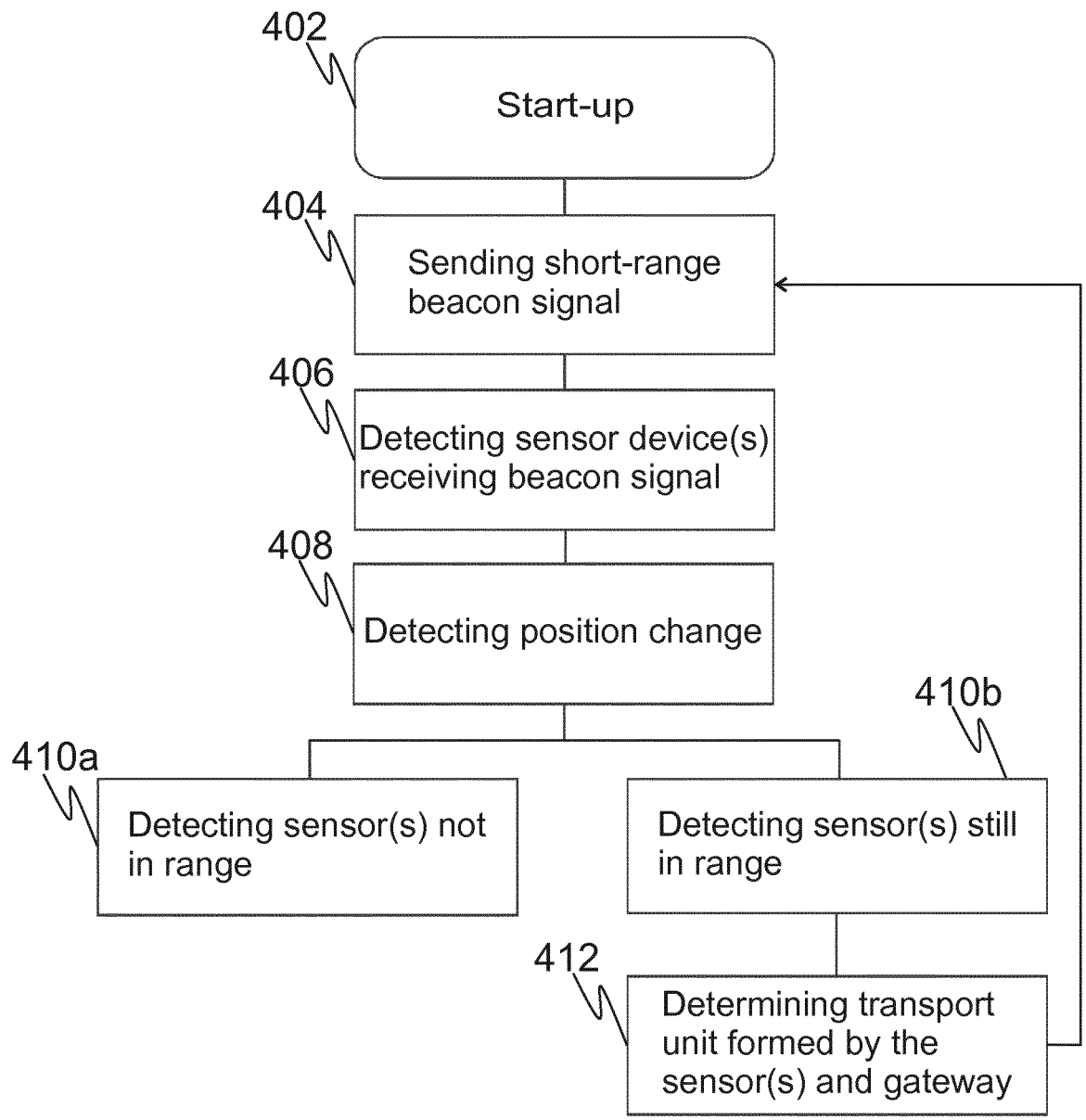
FIG. 4 illustrates a flow chart of a method in accordance with an embodiment of the present invention.

FIG. 4 illustrates a flow chart of a method in accordance with an embodiment of the present invention.

At 402, a transport unit, such as a truck is at least associated with a gateway device. The gateway device may also be connected with the transport unit communications or such internal system e.g. for receiving information of the transport unit location. The transport unit may for example drive to a zone where the truck may be loaded with cargo comprising tracking sensor nodes.

At 404, the gateway device associated with the transport unit sends a beacon signal via short-range communication means. The beacon signal may be sent continuously such that new nodes entering the coverage of the gateway device network may connect and register with the gateway device.

At 406, the gateway device detects and registers the nodes in the coverage area of the gateway device.

At 408, movement of the transport unit is detected. If the movement surpasses a set threshold such as leaving or entering a geofence, the gateway device checks again which nodes are still connected to it and forms a sensor network with the nodes in its short-range network coverage.

At 410a, the gateway device may detect which nodes are not anymore in its coverage and therefore not part of the cargo unit to which the gateway device pertains.

At 410b, the gateway device detects which nodes are still in its coverage after surpassing the movement threshold.

At 412, the gateway device may record and/or transmit the information about which nodes are still in its coverage after surpassing the movement threshold as to pertain to that particular transport unit to a remote server or cloud, which server or cloud may further record said information of a cargo unit with the information of the gateway device and identified tracking sensor nodes in the particular cargo unit. This way the arrangement may remotely recognize the location of certain nodes and cargo thereof using only the location and/or positioning information of the gateway device.

The arrangement allows for large-scale utilization and scalability for a number of nodes which may be monitored essentially real-time during the transit. Also, the nodes may comprise essentially any kind of tracking or other wireless sensors that may connect with a gateway device via short-range communications means.

The scope of the invention is determined by the attached claims together with the equivalents thereof. The skilled persons will again appreciate the fact that the disclosed embodiments were constructed for illustrative pur-poses only, and the innovative fulcrum reviewed herein will cover further embodiments, embodiment combinations, variations and equivalents that better suit each particular use case of the invention.

The invention claimed is:

1. A gateway device for associating the gateway device and tracking sensors as single a cargo unit, comprising:
   the gateway device being associable with a cargo unit, said gateway device comprising:
   means to detect position or movement, and
   short-range wireless communication means for sending out a beacon signal and connecting with nodes, wherein the gateway device is arranged to detect which nodes are still in short-range communications range when change of position or movement is detected and associating the nodes that are still in range with as being part of the same cargo unit as the gateway device.

2. An arrangement for associating tracking sensors with a cargo unit comprising:
   a gateway device associable with a cargo unit comprising means to detect position or movement, and short-range wireless communication means for sending out a beacon signal,
   tracking sensors arranged to receive the beacon signal when in short-range communications proximity, wherein the gateway device is arranged to detect which tracking sensors are still in short-range communications range when change of position or movement is detected and associating the sensors that are still in range with as being part of the same cargo unit as the gateway device.

3. The arrangement of claim 2 wherein the short-range communication means comprise IEEE 802.11, IEEE 802.15.1 and/or such ISM/SRD band communication means.

4. The arrangement of claim 2 wherein the means to detect position or movement comprise satellite, triangulation or Cell ID positioning means.

5. The arrangement of claim 2 wherein movement is detected in accordance with predetermined geofences, such as that movement is detected by movement in or out of geofences.

6. The arrangement of claim 2 wherein the cargo unit is a mobile cargo transport, such as aircraft, rail, ship or truck transport.

7. A method for associating tracking sensors with a cargo unit comprising:
   sending a beacon signal from a gateway device towards tracking sensor nodes via short-range communications means,
   detecting tracking sensor nodes receiving the beacon signal,
   detecting movement or position change at the gateway device,
   detecting which tracking sensor nodes are still connected to the gateway device after the detected movement or position change,
   corresponding the gateway device and the tracking sensor nodes that are still connected to the gateway device after the detected movement or position change with a single cargo unit.

8. The method according to claim 7 wherein movement or position change are detected only when a predetermined threshold is met.

9. The method according to claim 7 wherein the threshold for detecting movement or position change is moving in or out of a geofence.

* * * * *